United States Patent [19]

Kurokawa et al.

[11] 3,725,572

[45] Apr. 3, 1973

[54] COLOR TELEVISION CAMERA

[75] Inventors: Hiromichi Kurokawa; Yasuharu Kubota, both of Kanagawa-ken, Japan

[73] Assignee: Sony Corporation, Tokyo, Japan

[22] Filed: Dec. 21, 1971

[21] Appl. No.: 210,342

[30] Foreign Application Priority Data

Dec. 26, 1970 Japan ..............................45/128853

[52] U.S. Cl. .............................................178/5.4 ST
[51] Int. Cl. ................................................H04n 9/06
[58] Field of Search........................178/5.4 R, 5.4 ST

[56] References Cited

UNITED STATES PATENTS 2,908,835 10/1959 Weimer ..........................178/5.4 ST

*Primary Examiner*—Robert L. Richardson
*Attorney*—Lewis H. Eslinger et al.

[57] ABSTRACT

In a color television camera having a target structure which is scanned by an electron beam and on which is projected an image of an object in the field of view of the camera; the target structure comprises first and second groups of photoconductive elements, such as diodes, preferably formed in a semiconductor substrate and being arrayed in lines extending in the line scanning direction and rows extending at substantial angles to the lines, with the lines of the first group of diodes being alternated with the lines of the second group of diodes, color filter elements corresponding to the diodes, respectively, and being disposed between the latter and the object for forming color components of the projected image on the respective diodes, first electrodes connected to the first and second groups, respectively, of the diodes for applying to the latter an alternating signal having phase alternation by line and for picking-up a color video signal corresponding to the projected image in response to the conversion by said diodes of light projected thereon into an electrical output when scanned by the electron beam, and second electrodes arranged generally in the direction of the rows of diodes for receiving an alternating signal having phase alternation by field and for picking-up an index signal corresponding with the arrangement of the second electrodes along the line being scanned and having phase alternation by field. The color video signal and index signal thus formed are combined in a composite signal which is supplied to circuits by which the index signal is employed for deriving the individual color signals from the color video signal.

17 Claims, 15 Drawing Figures

INVENTORS
HIROMICHI KUROKAWA
YASUHARU KUBOTA
BY
ATTORNEY

INVENTORS
HIROMICHI KUROKAWA
YASUHARU KUBOTA
BY
ATTORNEY

INVENTORS
HIROMICHI KUROKAWA
YASUHARU KUBOTA
BY [signature]
ATTORNEY

INVENTORS
HIROMICHI KUROKAWA
YASUHARU KUBOTA
BY
ATTORNEY

INVENTORS
HIROMICHI KUROKAWA
YASUHARU KUBOTA
BY
ATTORNEY

COLOR TELEVISION CAMERA

This invention relates generally to color television cameras, and more particularly is directed to a color television camera having a single image pickup tube provided with a target structure composed of an array of solid-state photoconductive elements, such as, silicon diodes.

A pickup tube of the type having a target with a multiplicity of color filters and signal plates extending transversely of the direction of line scan has been disclosed in U.S. Pat. No. 2,446,249. In this type of pickup tube the signal plates corresponding to the color filters of each primary color are connected to respective electrodes or bus bars and the respective primary or individual color signals are derived from three signal output terminals connected to the electrodes. However, this pickup tube is defective in that each primary color signal is mixed with other primary color signals due to the electrostatic capacitive coupling present between the respective signal electrodes. This results in crosstalk which lowers the color purity of the color video signal.

There has also been proposed a system, such as that disclosed in U.S. Pat. No., 3,502,799, in which a plurality of index signal images and striped color component images are optically formed on the target of a vidicon tube to produce a composite signal containing the color video signal and an index signal. With this system, however, the ratio between the color component image area and the effective scanning area of the vidicon is decreased by an amount corresponding to the area occupied by the index signal images, and this results in lower resolution. Further, this prior art system necessitates a complicated and expensive device for optically forming the index signal images on the target.

Further, in the copending U.S. Pat. application Ser. No. 72,593, filed Sept. 16, 1970, by Yasuharu Kubota, one of the joint inventors herein, and having a common assignee herewith, there is disclosed a color television camera which comprises a single image pickup tube having a photoconductive layer on which a color separated image of an object to be reproduced is projected, and indexing electrodes disposed in close proximity to the photoconductive layer to electrically produce an index image on that layer in response to the application of different voltages to the indexing electrodes, so that the electrical output from the photoconductive layer, which may be picked up by the indexing electrodes, is a composite signal containing a color video signal corresponding to the color separated image and an index signal corresponding to the index image and by which individual color component signals may be separated from the color video signal. In such image pickup tube, the color separated image of the object in the field of view of the camera are provided by triads of filter elements in the form of stripes which extend at right angles to the line scanning direction and which transmit respective primary colors, for example, red, green and blue light. Further, the indexing electrodes are defined by transparent conductive stripes extending parallel to the stripe-like filter elements with a pair of such indexing electrodes being associated with each triad of filter elements and receiving the different voltages so that the frequencies of the color carrier and of the index signal are identical. The voltage difference applied to the indexing electrodes is alternated in each line scanning period, so that the index signal has its phase alternated in successive line scans and the color carrier signal has a high line-to-line correlation. Therefore, good separation between the color carrier signal and the index carrier signal is generally achieved by a one-line memory or delay. Further, by the quadrature demodulation of the color carrier signal with the index carrier signal, color difference signals can be obtained and these can be further processed in the usual way to produce color television signals according to the Ntsc system or other standard systems.

It has been proposed, for example, in U.S. Pat. No. 3,011,089, to provide the image pickup tube of a television camera with a target made up of a mosaic of solid state light-sensitive devices, such as, diodes, formed on or in a semiconductor layer or substrate. In operation, when any one of the diodes has the scanning electron beam focused thereon, such diode is charged in the reverse direction to a predetermined voltage, such as, from 5 to 10V. In the scanning interval, that is, in the interval between successive scans of the particular diode by the beam, the voltage across the P-N junction decays, that is, the diode discharges, at a rate that is dependent upon the intensity of light impinging on the diode, with the rate of decay increasing with the intensity of light. Thereafter, when the electron beam is again focused on the diode in question, the current required to restore the diode to the reference charge level is proportional to the intensity of the light incident on the diode. Therefore, during the scanning of the mosaic of diodes, video signals are obtained which correspond to the light intensities incident on the diodes successively scanned by the beam.

In order to provide a color television camera which is small in size and of light weight, and which is further operable by relatively low power and of high reliability, it is desirable to furnish the image pickup tube thereof with a target made up of a mosaic of solid state light-sensitive devices formed on or in a semi-layer or substrate, as aforesaid. However, the provision of such a target in the image pickup tube of a color television camera of the type disclosed in U.S. Pat. application Ser. No. 72,593, and which has been briefly described above, presents difficulties, particularly as to obtaining the index signal by means of the electrical formation of an index image on the target.

Accordingly, it is an object of this invention to provide a color television camera that includes a single image pickup tube having a target formed of a mosaic of solid state light sensitive devices on or in a semi-conductor substrate or layer, and in which an index image is electrically produced on the target in association with a color separated image of the object in the field of view of the camera to provide a composite output signal from the tube containing a color video signal and an index signal by which the several color signals can be reliably derived from the color video signal.

Another object is to provide a color television camera, as aforesaid, and which is free of hue distortion even if there is cross-talk between the index signal and the luminance signal included in the color video signal of the composite output signal.

In accordance with an aspect of this invention, the mosaic of solid state light-sensitive devices or photoconductive elements consists of first and second groups thereof arrayed in lines extending in the line scanning direction and in rows at substantial angles to such direction with the lines of the first group being alternated with the lines of the second group and preferably also with the rows of the first and second groups being offset from each other, the color filter elements individually correspond with the photoconductive elements and are similarly arranged, first electrodes are respectively connected with the first and second groups of photoconductive elements for alternately activating the first and second groups in synchronism with the line scanning and for picking up the color video signal from the successively scanned photoconductive elements, and second electrodes are provided on the target, preferably at the surface thereof opposite to that having the first electrodes thereon, and extend generally in the direction of the rows of photoconductive elements for forming an index image on the target when an alternating voltage having its phase reversed or alternated in successive field scanning periods is applied to the second electrodes, and for picking up the corresponding index signal.

The above, and other objects, features and advantages of this invention, will be apparent in the following detailed description of an illustrative embodiment which is to be read in connection with the accompanying drawings, wherein.

Figures 1, 2, 4:
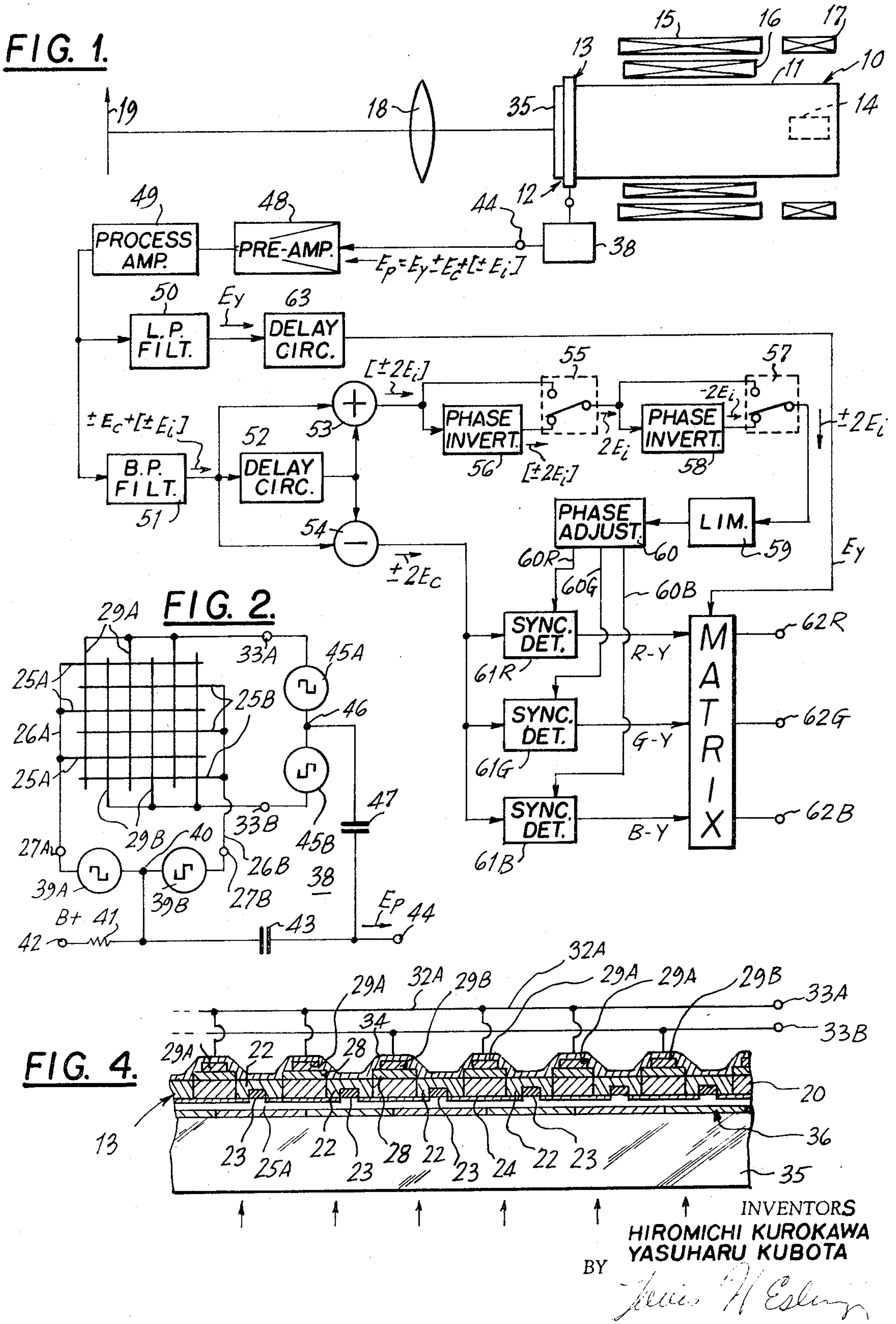
FIG. 1 is a schematic diagram illustrating the components of a color television camera in accordance with the present invention.
FIG. 2 is a schematic diagram illustrating a circuit included in one of the components of FIG. 1 and the connections of such circuit to a target of the image pickup tube.
FIG. 4 is a transverse sectional view taken along the line 4—4 on FIG. 3.

Referring to the drawings in detail, and initially to FIG. 1 thereof, it will be seen that a color television camera according to this invention generally comprises a single image pickup tube 10 having an envelope 11 closed at its front end by a face plate assembly 12 including a targe 13 against which there impinges an electron beam issuing from a gun 14. The tube 10 is further shown to have a focusing coil 15 for focusing the electron beam on target 13, a deflection coil 16 for deflecting the electron beam so that the latter scans the target in a horizontal or line scanning direction, and an alignment coil 17. A lens 18 is provided for focusing on the target 13 an image of an object 19 disposed in the field of view of the camera.

Figure 3:
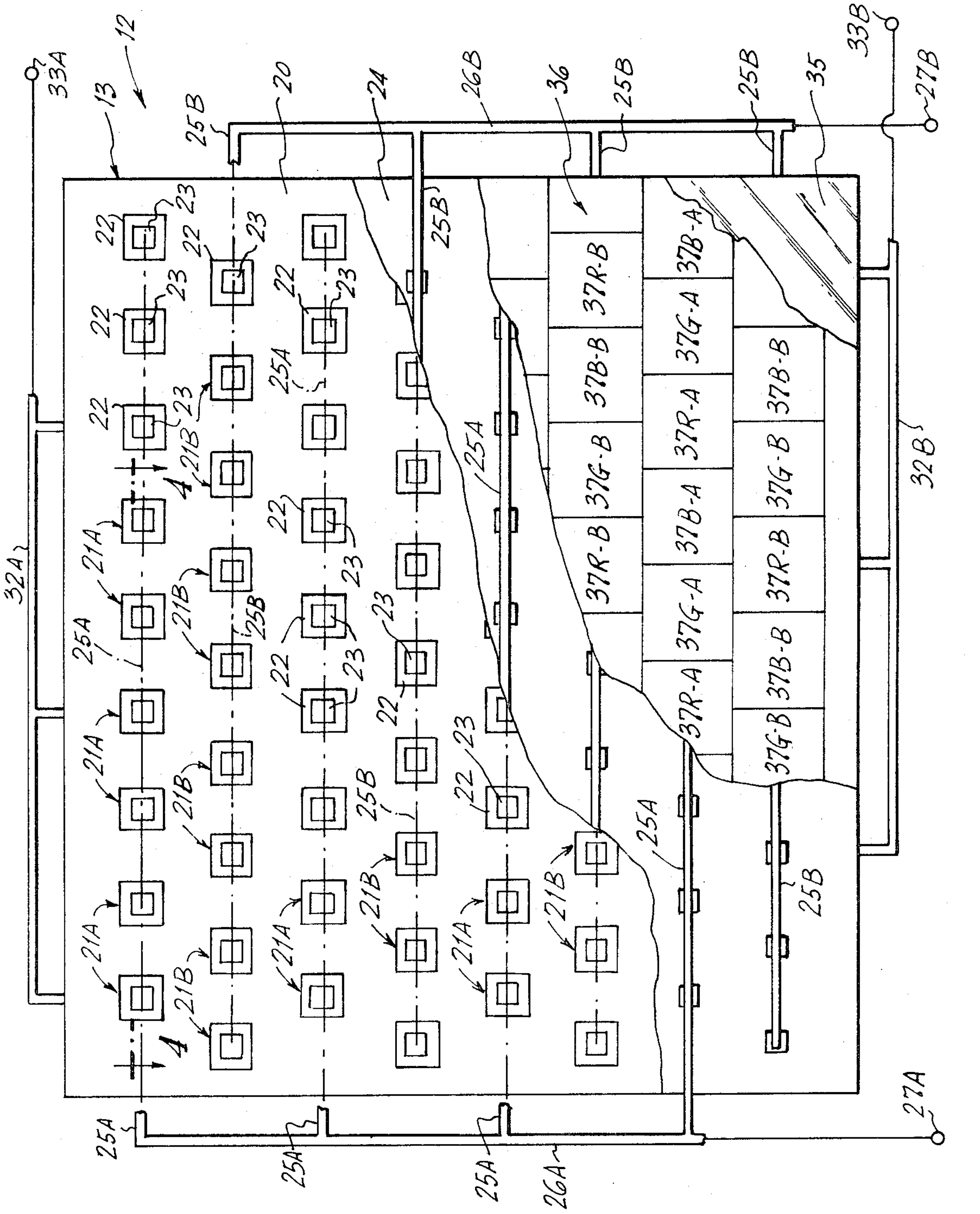
FIG. 3 is a schematic front elevational view of the face plate assembly of the image pickup tube, with the various portions thereof being successively broken away to disclose the arrangement of the target.
Figure 5:
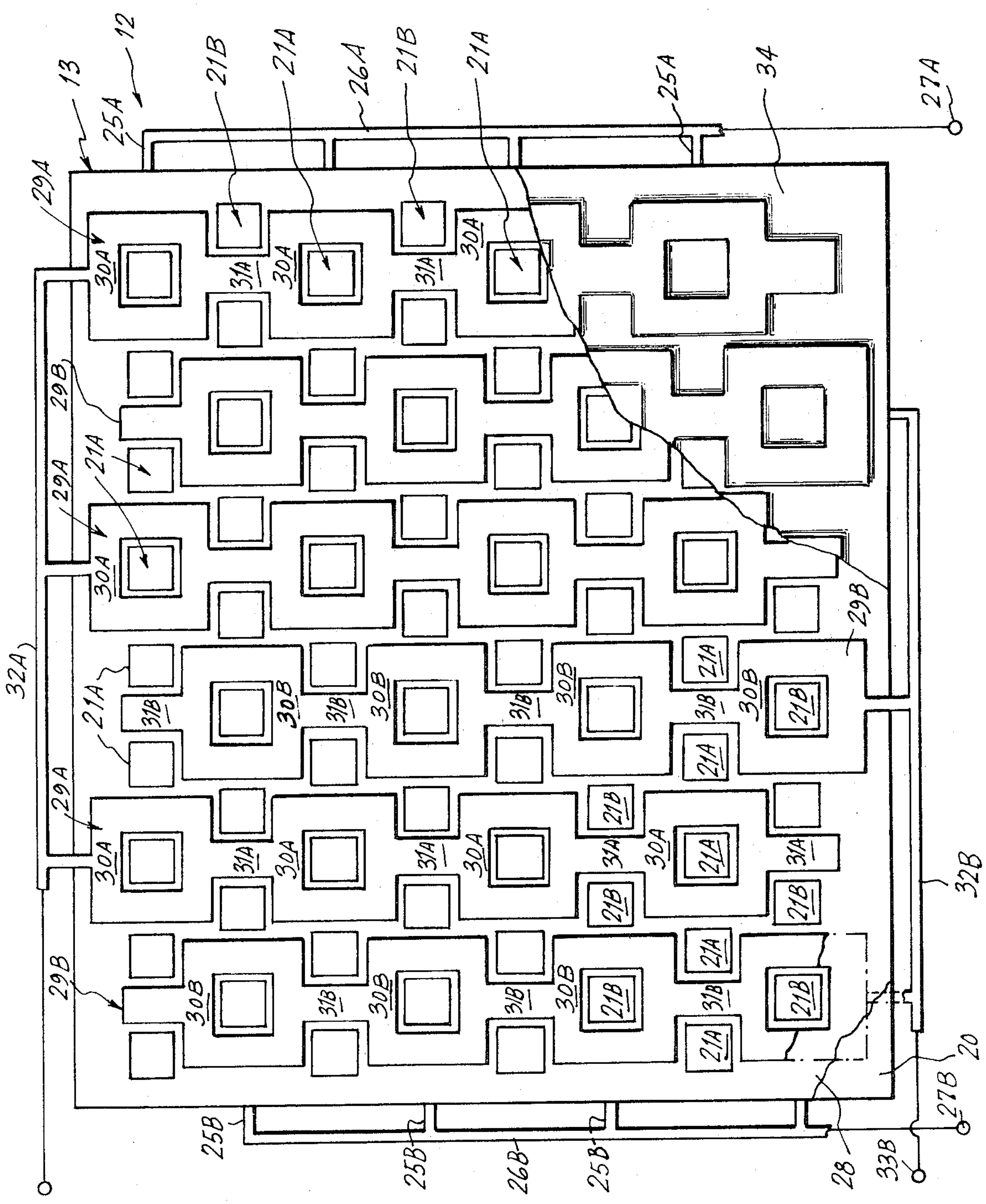
FIG. 5 is a schematic rear elevational view of the face plate assembly with portions thereof being successively broken away.

As shown particularly on FIGS. 3, 4 and 5, the target 13 of face plate assembly 12 comprises a semiconductive layer or substrate 20 of N-type conductivity in which there are formed a first group of solid state light-sensitive or photoconductive elements 21A and a second group of solid state light-sensitive or photoconductive elements 21B arranged to constitute a mosaic of such photoconductive elements. The first and second groups of photoconductive elements 21A and 21B are each arrayed in lines extending horizontally, that is, in the line scanning direction, and in rows extending at substantial angles, for example, at right angles, to the line scanning direction, with the lines of elements 21A being alternated with respect to the lines of elements 21B, so that the lines of elements 21A are scanned during odd line seams and the lines of elements 21B are scanned during even line scans. Further, as shown on FIGS. 3 and 5, the elements 21A are preferably offset or staggered in the direction of the lines thereof relative to the elements 21B in the adjacent lines of the latter so that the rows of elements 21A are preferably midway between the rows of elements 21B.

In the illustrated embodiment, each of the photoconductive elements 21A and 21B is in the form of a light-sensitive diode constituted by a P-type region 22 formed in substrate 20 and by an N-type region 23 formed in the respective P-type region 22 from the front surface of the target.

A transparent insulating layer 24 covers the front surface of target 13 with the exception of the areas thereof constituted by the N-type regions 23 of the diodes constituting photoconductive elements 21A and 21B, and first electrodes 25A and 25B extend laterally across insulating layer 24 at the lines of elements 21A and 21B, respectively, and are connected with the N-type regions 23 of those elements 21A and 21B through the respective openings or windows in insulating layer 24. The first electrodes 25A connected with the first group of elements 21A and the first electrodes 25B connected with the second group of elements 21B are respectively connected to each other, as by bus bars 26A and 26B, respectively, which extend to terminals 27A and 27B (FIGS. 2,3 and 5).

The target 13 further has an insulating layer 28 covering the back surface of semiconductive substrate 20 with the exception of the areas of the latter constituted by the regions 22 of elements 21A and 21B (FIGS. 4 and 5), and second electrodes 29A and 29B are provided on insulating layer 28 and extend generally in the direction of the rows of elements 21A and 21B, that is, substantially at right angles to the line scanning direction. As shown particularly on FIG. 5, each of the second electrodes 29A preferably includes a plurality of spaced apart open square portions 30A which extend around elements 21A in a particular row of the latter and neck portions 31A which connect square portions 30A and extend between elements 21B in adjacent lines of the latter. Similarly, each of the second electrodes 29B preferably includes a plurality of spaced apart open square portions 30B which extend around elements 21B in a particular row of the latter and neck portions 31B which connect square portions 30B and extend between elements 21A in adjacent lines of the latter. The electrodes 29A and 29B are shown to be alternately arranged across the target 13 so that, in all lines of the elements 21A and 21B making up the mosaic thereof, portions of electrodes 29A or 29B are interposed between all of the elements 21A or 21B. More specifically, in each of the odd-numbered lines of elements 21A, scanning of that line in the direction from right to left, as viewed on FIG. 5, will cause electrodes 29A and 29B to be encountered in the order 29A-29A-29B-29A-29A-29B-29A-29A-29B - - - etc. On the other hand, scanning of each even numbered line of elements 21B in the direction from right to left, as viewed on FIG. 5, will cause electrodes 29A and 29B to be encountered in the order 29A-29B-29B-29A-29B-29B-29A-29B-29B - - - etc. Therefore, it will be seen that the described configurations of electrodes 29A and 29B result in an order of such electrodes relative to elements 21A in the odd-numbered lines of the mosaic which has a differential relation to the order of the electrodes 29A and 29B relative to elements 21B in the even-numbered lines of the mosaic.

The electrodes 29A are connected to each other, as by a bus bar 32A connected to a terminal 33A, and the electrodes 29B are similarly connected to each other by a bus bar 32B extending to a terminal 33B. A semi-insulating layer 34, for example, of titanium oxide which has a sheet resistance of about $10^{10}$ ohms/$cm^2$, covers the entire back of target 13, and thus extends from the electrodes 29A and 29B onto the region 22 of photoconductive elements 21A and 21B which are exposed at the openings of insulating layer 28.

Figure 7:
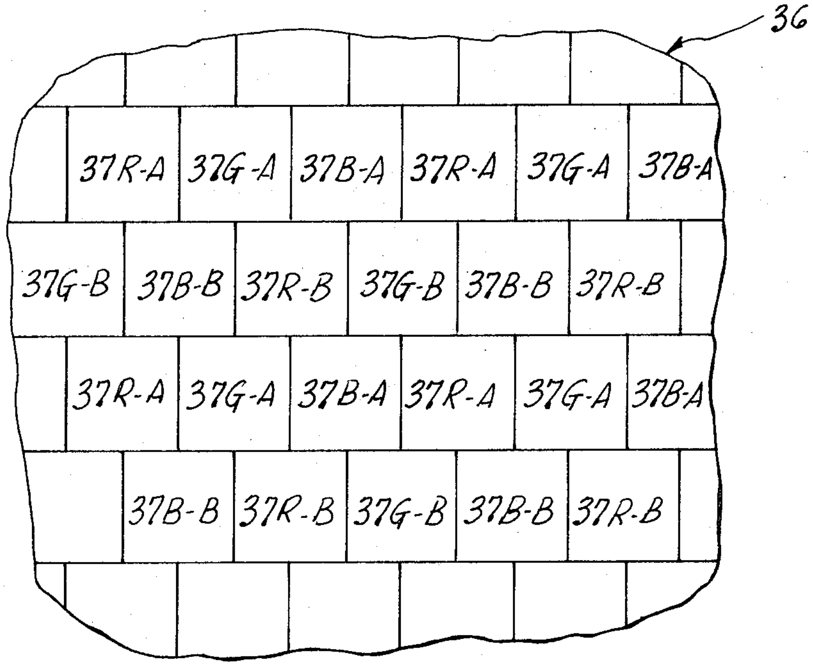
FIG. 7 is a schematic, fragmentary front elevational view of the color filter employed in the image pickup tube.

The face plate assembly 12 is further shown to include a glass face plate 35 (FIGS. 3 and 4) disposed in front of target 13 and having a color filter 36 formed on the back surface of plate 35. As shown particularly on FIG. 7, the color filter 36 is made up of individual color filter elements 37R,37G and 37B operative to transmit or pass light of different primary colors, for example, red, green and blue light, respectively, and which are arranged in lines and rows corresponding to the lines and rows of the photoconductive elements 21A and 21B. On the drawings, the color filter elements corresponding to elements 21A are identified by the suffix "-A" appended thereto, as 37R-A, 37G-A and 37B-A, and the color filter elements corresponding to elements 21B are identified by the suffix "-B", as 37R-B, 37G-B and 37B-B. It will be seen that the color filter elements are grouped in triads arranged in the repeating cyclic order 37R-A, 37G-A, 37B-A, 37R-A, 37G-A, 37B-A B-A - - - etc. and in the repeating cyclic order 37R-B, 37G-B, 37B-B, 37R-B, 37G-B, 37B-B - - - etc., considered in the directions of line-scanning. Further, as shown, the triads of filter elements 37R-B, 37G-B and 37B-B corresponding to the photoconductive elements 21B are offset in the line-scanning direction relative to the triads of filter elements 37R-A, 37G-A and 37B-A corresponding to photoconductive elements 21A by a distance equal to one-half the pitch of each triad, that is, one-half the combined width of the three color filter elements included in each triad thereof.

Referring now to FIGS. 1 and 2, it will be seen that a circuit 38 is connected to target 13 for supplying reference signals to the electrodes of the latter and for picking-up color video and index signals from such electrodes, as hereinafter described in detail. More specifically, circuit 38 is shown to include alternating signal generators or sources 39A and 39B producing alternating signals having rectangular waveforms which are of opposite phase and which are synchronized with the line-scanning frequency so that the signal from each of generators 39A and 39B undergoes a phase reversal at the commencement of each line scanning period. The alternating signal sources or generators 39A and 39B are respectively connected to terminals 27A and 27B, and hence to electrodes 25A and 25B, respectively, and a junction 40 between sources 39A and 39B is connected through a resistor 41 with a terminal 42 at which a bias voltage B+ is applied. The junction 40 is also connected through a capacitor 43 with an output terminal 44. The circuit 38 is further shown to include alternating signal generators or sources 45A and 45B producing alternating signals having rectangular waveforms which are of opposite phase and which are synchronized with the field frequency so that the signal from each of generators 45A and 45B undergoes a phase reversal at the commencement of each field period. The alternating signal sources or generators 45A and 45B are respectively connected to the terminals 33A and 33B, and hence to electrodes 29A and 29B, respectively, and a junction 46 between generators 45A and 45B is connected to output terminal 44 through a capacitor 47.

Figure 6A:
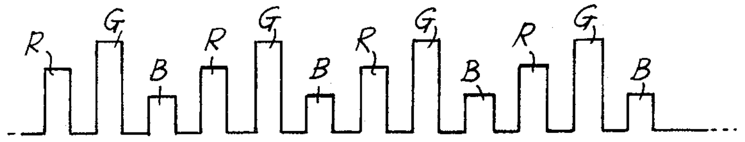
FIGS. 6A–6H are waveform diagrams to which reference will be made in explaining the operation of a color television camera according to this invention.
Figure 6B:
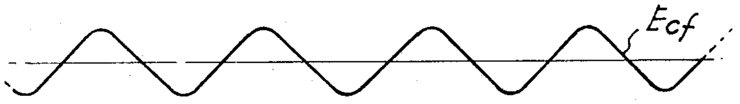
Figure 6C:
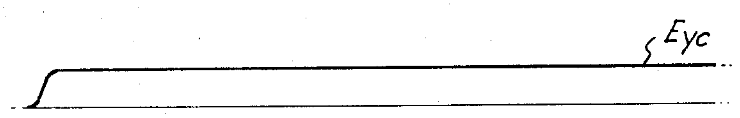

With the arrangement of circuit 38 described above, during scanning of each odd-numbered line of target 13, that is, each line constituted by photoconductive elements 21A, the potential of electrodes 25A is higher than the potential of electrodes 25B. Thus, during the scanning of each line of elements 21A, such elements are rendered operative to provide signals corresponding to the intensities of light impinging thereon through the respective color filter elements 37R-A, 37G-A and 37B-A as the successive elements 21A are scanned by the electron beam. However, the relatively low potential applied to electrodes 25B ensures that the photoconductive elements 21B in the lines adjacent to the line of elements 21A being scanned will remain inoperative, whereby to avoid undesired signals from such adjacent elements 21B during the scanning of each line of elements 21A. The resulting signals are picked up by electrodes 25A and appear at output terminal 44 through capacitor 43, and may have the waveform shown on FIG. 6A. Such signals consist of the luminance signal $E_y$, whose low frequency component $E_{yl}$ has the waveform shown on FIG. 6C, and the chrominance signal $E_c$ whose carrier has the fundamental component $E_{cf}$ with the waveform shown on FIG. 6B.

Figure 6D:
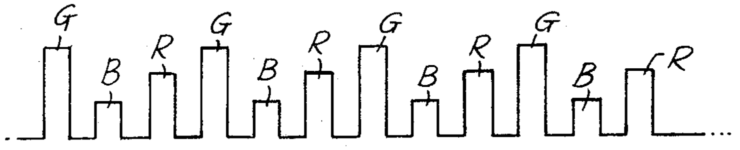
Figure 6E:
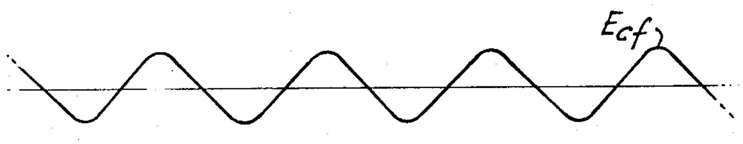
Figure 6F:
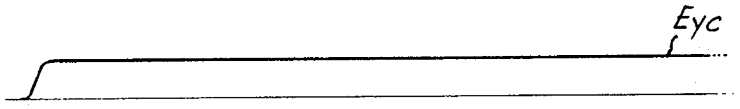

Conversely, during the scanning of each even-numbered line of the mosaic, that is, during the scanning of a line of photoconductive elements 21B, such elements are rendered operative by the relatively high potential applied to electrodes 25B, whereas the adjacent lines of photoconductive elements 21A are rendered inoperative by the low potential on electrodes 25A. Thus, as the electron beam scans a line of elements 21B, only such elements provide signals corresponding to the intensities of light impinging thereon through color filter elements 37R-B, 37G-B, and 37B-B. The resulting signals are picked up by electrodes 25B and appear at output terminal 44 through capacitor 43, and may have the waveform shown on FIG. 6D. The signals from elements 21B also consist of a luminance signal $E_y$, whose low frequency component $E_{yl}$ has the waveform shown on FIG. 6F, and the chrominance signal $E_c$, whose carrier has the fundamental component $E_{cf}$ waveform shown on FIG. 6E. A comparison of the waveforms shown on FIGS. 6B and 6E will show that the phase of the chrominance signal carrier $E_c$ is reversed in successive line scanning periods by reason of the fact that the elements 21A and 21B in adjacent lines are offset in the line scanning direction by one-half the distance between the photoconductive elements 21A or 21B in each line of the mosaic. In the following description, the chrominance signal having phase reversal of its carrier in successive line scanning periods is designated $\pm E_c$. Further, it is to be understood that, on each of FIGS. 6A and 6D, the reference letters R,G and B refer to the respective portions of the color video signal corresponding to the red, green and blue components of the image projected on the target.

Figure 6G:
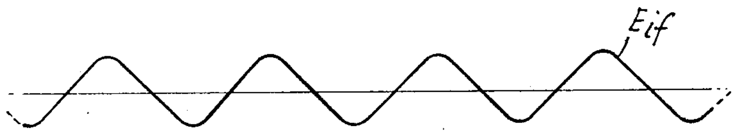
Figure 6H:
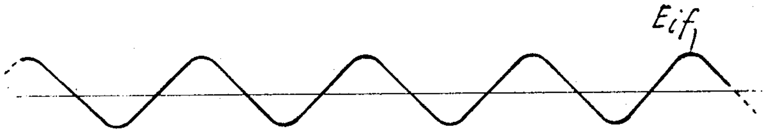

During each odd-numbered field scanning period, sources 45A and 45B apply relatively high and low potentials to electrodes 29A and 29B, respectively, so that an index signal $E_i$ in accordance with the arrangement of the electrodes 29A and 29B will be applied to output terminal 44 through capacitor 47. The fundamental component $E_{if}$ of the index signal $E_i$ during each odd-numbered field scanning period has the waveform shown on FIG. 6G. By reason of the alternation of the signals from sources 45A and 45B in synchronism with the field scanning frequency, relatively low and high potentials are applied to electrodes 29A and 29B, respectively, during each even-numbered field scanning period, and, accordingly, the index signal $E_i$ derived at output terminal 44 during each even-numbered field scanning period has a fundamental component $E_{if}$ with the waveform shown on FIG. 6H. Thus, the phase of the index signal $E_i$ during each even-numbered field scanning period is reversed with respect to that of the index signal during each odd-numbered field scanning period. These index signals which change phase in successive field scanning periods are hereinafter designated $[\pm E_i]$.

Thus, it will be apparent that the composite signal $E_p$ appearing at output terminal 44 consists of the luminance signal $E_y$, the chrominance signal $\pm E_c$ and the index signal $[\pm E_i]$ and may be represented by the following equation:

$$E_p=E_y+(-1)^l E_c \sin(\omega t+\theta_c)+)-1)^f E_i \sin(\omega t)$$

in which, $l$ is the line number, and $f$ is the field number.

It will be apparent from the above equation that the composite signal $E_p$ has components with phases that are alternated by line and by field, respectively, and these phase alternations may be made use of in deriving color signals from the composite signal, as hereinafter described in detail.

With reference to FIG. 1, it will be seen that the composite signal $E_p$ is supplied from output terminal 44 through a preamplifier 48 to a process amplifier 49 for waveform shaping and/or gamma correction. Thereafter, the signal is applied to a low pass filter 50 and to a band-pass filter 51. The luminance signal $E_y$ is passed through low pass filter 50, and a composite signal $\pm E_c+[\pm E_i]$ is passed through band-pass filter 51. The signal $\pm E_c+[\pm E_i]$ from filter 51 is passed through a delay circuit 52, for example, an ultrasonic delay line, by which such signal is delayed by one horizontal line scanning period and may be written as $\mp E_c+[\pm E_i]$. The delayed output from delay circuit 52 and the output of filter 51 are supplied to an adder circuit 53 and are added to each other in the latter to provide the output $[\pm 2E_i]$ having phase reversal in successive field scanning periods. That is, $(\pm E_c+]\pm E_i])+(\mp E_c+[\pm E_i]=[\pm 2E_i]$. Further, the output $\pm E_c+]\pm E_i]$ from band-pass filter 51 and the delayed output $\mp E_c+[\pm E_i]$ from delay circuit 52 are also supplied to a subtraction circuit 54 in which the inputs are subtracted from each other to provide the output $\pm 2E_c$ having phase reversal in successive line scanning periods. That is, $(\pm E_c+[\pm E_i])-(\mp E_c+[\pm E_i])=\pm 2E_c$.

In order to convert the output signal $[\pm 2E_i]$ from adder circuit 53 into a signal $\pm 2E_i$ which has phase reversal in successive line scanning periods, similarly to the output signal $\pm 2E_c$ from the subtraction circuit 54, the signal $[\pm 2E_i]$ is supplied directly to a first switching circuit 55 and is also supplied to a first phase inverter 56 providing an output $[\mp 2E_i]$ which is applied to switching circuit 55. The switching circuit 55 is switched over in each field scanning period, and thus continuously supplied the signal $2E_i$. The signal $2E_i$ is supplied directly to a second switching circuit 57 and is also supplied to a second phase inverter 58 providing an output $-2E_i$ which is applied to switching circuit 57. The switching circuit 57 is switched over in each line scanning period to provide the output signal $\pm 2E_i$ which has phase reversal in successive line scanning periods.

The signal $\pm 2E_i$ from switching circuit 57 is supplied through a limiter 59 to a phase adjuster or shifter 60 having three outputs 60R, 60G and 60B at which respective index signals corresponding to the index signal $\pm 2E_i$, but phase shifted 120° relative to each other, are supplied to respective synchronous detectors 61R, 61G and 61B which further receive the signal $\pm 2E_c$ from subtraction circuit 54. The synchronous detectors 61R, 61G and 61B respectively provide color difference signals R-Y, G-Y and B-Y which are applied to a matrix circuit 62. The output $E_y$ of the low pass filter 50 is also supplied through a delay circuit 63 to matrix circuit 62, so that respective color signals R, G and B are derived at the output terminals 62R, 62G and 62B of the matrix circuit. The color signals thus obtained may be suitably processed to produce color television signals for the NTSC system or for various other standardized systems.

It will be seen from the above that, in the described color television camera according to this invention, color television signals are obtained through the use of a single image pickup tube. Further, with the camera according to this invention, even if the luminance signal $E_y$ appears in the index signal $E_i$ as cross-talk so that the resulting color difference signals R-Y, G-Y and B-Y have hue distortion, such hue distortion is cancelled visually by reason of the fact that the index signal $E_i$ has phase reversal in successive field scanning periods and, therefore, good color video signals are obtained.

Figure 8:
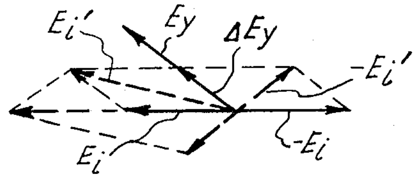
FIG. 8 is a vector diagram to which reference will be made in explaining how the color television camera according to the invention avoids hue distortion.

The foregoing advantage of the camera according to this invention will be explained with reference to FIG. 8 in which, during an odd-numbered field scanning period, the index signal $E_i$ has a cross-talk component $\Delta E_y$ of the luminance signal $E_y$ so that the phase of the index signal is shifted to the position indicated at $E_i'$. In the next or even-numbered field scanning period, the index signal $-E_i$ also has a cross-talk component $\Delta E_y$ of the luminance signal $E_y$ so that the phase of the index signal $-E_i$ is shifted to the position shown at $-E_i'$. In the even-numbered field scanning period, the phase of signal $-E_i$ is reversed, as described above, so that the signal $-E_i'$ is converted to the signal $(E_i)'$. Therefore, any hue distortion produced by the color difference signals detected with the index signal $E_i$ in an odd-numbered field scanning period and any hue distortion produced by the color difference signals detected with the signal $(E_i)$ in the even-numbered field scanning period visually cancel each other. In other words, the situation is similar to that in which the carrier chrominance signals are detected with the signal $E_i''$ shown on FIG. 8 and which has the same phase as the index signal $E_i$.

Although an illustrative embodiment of the invention has been described in detail herein, it is to be understood that the invention is not limited to that precise embodiment, and that various changes and modifications may be effected therein by one skilled in the art without departing from the scope or spirit of the invention.

What is claimed is:

1. In a color television camera having a target structure, means for producing an electron beam which scans the target structure in a line scanning direction, and means for projecting onto the target structure an image of an object in the field of view of the camera; said target structure comprising a first group of photoconductive elements for converting light projected thereon into an electrical output when scanned by said electron beam and being arrayed in lines extending in said line scanning direction and in rows at substantial angles to said direction, a second group of photoconductive elements for converting light projected thereon into an electrical output when scanned by said electron beam and also being arrayed in lines extending in said line scanning direction and in rows at substantial angles to said direction with said lines of the photoconductive elements of said second group being alternated with said lines of the photoconductive elements of said first group, color filter elements each corresponding to a respective one of said photoconductive elements and being disposed between the latter and the object for forming on the respective photoconductive elements corresponding color components of said image projected on the target structure, first electrodes extending generally along said lines of photoconductive elements and being connected with said first group and said second group, respectively, of said photoconductive elements for picking up a color video signal from said photoconductive elements in response to the successive scanning thereof by said electron beam, and second electrodes arranged generally in the direction of said rows of photoconductive elements for producing an index signal.

2. A color television camera according to claim 1, in which said rows of the photoconductive elements are substantially at right angles to said lines thereof.

3. A color television camera according to claim 1, in which the photoconductive elements in each of said lines thereof in said first group are staggered with respect to the photoconductive elements in each of the adjacent lines of said second group.

4. A color television camera according to claim 1, further comprising means for supplying an alternating voltage to said first electrodes with the phase of said alternating voltage being reversed in successive horizontal scanning periods of said electron beam so as to alternately activate the photoconductive elements of said first and second groups only when a line of photoconductive elements in the respective group is being scanned by said beam.

5. A color television camera according to claim 4, further comprising means for supplying an alternating voltage to said second electrodes with the phase of the last mentioned alternating voltage being reversed in successive field scanning periods of said electron beam.

6. A color television camera according to claim 5, in which said color filter elements are constituted by triads of filter elements transmitting light of respective primary colors and arranged in a repeating cyclic order along said lines of the respective photoconductive elements, and there are a pair of said second electrodes extending between the photoconductive elements which are associated with each of said triads of filter elements.

7. A color television camera according to claim 6, in which the triads of color filter elements associated with the photoconductive elements in each of said lines are offset in the direction of said lines relative to said triads of filter elements associated with photoconductive elements in adjacent lines by approximately one-half the pitch of said repeating cyclic order.

8. A color television camera according to claim 1, in which said photoconductive elements are constituted by respective silicon diodes.

9. A color television camera according to claim 8, in which said diodes are formed in a semiconductor substrate.

10. A color television camera according to claim 9, in which said first electrodes and said second electrodes are respectively disposed at opposite surfaces of said semiconductor substrate.

11. In a color television camera having a target structure, means for scanning said target structure with an electron beam in a line scanning direction, and means for projecting onto said target structure an image of an object in the field of view of the camera; said target structure comprising first and second groups of photoconductive elements for converting light projected thereon into an electrical output when scanned by said electron beam and being arrayed in lines extending in said line scanning direction and in rows at substantial angles to said direction with said lines of the photoconductive elements of said first group being alternated with said lines of the photoconductive elements of said second group, color filter elements each corresponding to a respective one of said photoconductive elements and being disposed between the latter and the object for forming on the respective photoconductive elements corresponding color components of said image projected onto the target structure, first electrodes respectively connected with said photoconductive elements of said first and second groups, means for applying an alternating voltage to said first electrodes so as to alternately activate said first and second groups of photoconductive elements in synchronism with the scanning of said lines thereof and for picking up a color video signal corresponding to said projected image, second electrodes arranged generally in the direction of said rows of photoconductive elements, and means for applying an alternating voltage to said second electrodes and for picking up an index signal in accordance with the arrangement of said second electrodes along the line of said photoconductive elements being scanned.

12. A color television camera according to claim 11, in which said photoconductive elements are constituted by respective diodes.

13. A color television camera according to claim 12, in which said diodes are formed in a semiconductor substrate, and said diodes of said first group are offset, in the directions of said lines, with respect to the diodes of said second group.

14. A color television camera according to claim 11, in which said alternating voltage applied to the first electrodes has its phase reversed in successive horizontal scanning periods of said electron beam, and said alternating voltage applied to said second electrodes has its phase reversed in successive field scanning periods of said beam so that said index signal has phase alternation by field.

15. A color television camera according to claim 14, further comprising circuit means for combining said index signal having phase alternation by field with said color video signal to constitute a composite signal.

16. A color television camera according to claim 15, further comprising a delay circuit for receiving said composite signal and providing a delayed composite signal, an adder circuit for adding said composite signal and said delayed composite signal and providing said index signal having phase alternation by field, and a subtraction circuit for subtracting said delayed composite signal from said composite signal and providing said color video signal therefrom.

17. A color television camera according to claim 16, further comprising first inverting means for reversing the polarity of said index signal having phase alternation by field derived from said adder circuit, first switching means alternately passing the output of said first inverting means and said index signal as derived from said adder circuit and being switched-over in each field scanning period, second inverting means for reversing the polarity of the output of said first switching means, second switching means alternately passing said output of the first switching means and the output of said second inverting means and being switched-over in each line scanning period to provide an index signal having phase alternation by line, and demodulator means receiving said index signal having phase alternation by line and said color video signal from said subtraction circuit for providing therefrom output signals corresponding to the color components of said object in the field of view of the camera.

* * * * *